United States Patent [19]

Sharp

[11] Patent Number: 4,825,687

[45] Date of Patent: May 2, 1989

[54] STORAGE TANKS HAVING FORMED INNER TANK FOR PRIMARY CONTAINMENT

[76] Inventor: Bruce R. Sharp, 4090 Rosehill Ave., Cincinnati, Ohio 45229

[21] Appl. No.: 96,460

[22] Filed: Sep. 15, 1987

Related U.S. Application Data

[60] Continuation-in-part of Ser. No. 899,484, Aug. 22, 1986, Pat. No. 4,696,186, which is a division of Ser. No. 740,869, Jun. 3, 1985, Pat. No. 4,607,522, which is a continuation-in-part of Ser. No. 580,800, Feb. 16, 1984, Pat. No. 4,524,609, which is a continuation-in-part of Ser. No. 544,012, Oct. 21, 1983, abandoned, and Ser. No. 544,013, Oct. 21, 1983, Pat. No. 4,523,454.

[51] Int. Cl.[4] ............................................. G01M 3/32
[52] U.S. Cl. ...................................... 73/49.2; 220/444
[58] Field of Search ........................... 73/49.2 T, 49.3; 220/444, 445, 451, 452, 453, 1 B

[56] References Cited

U.S. PATENT DOCUMENTS 3,335,903  8/1967  Anderson ...................... 220/452 X
3,335,904  8/1967  Anderson ...................... 220/452 X
3,738,527  6/1973  Townsend ...................... 220/453 X
3,942,331  3/1976  Newman, Jr. et al. .......... 220/452 X
4,651,893  3/1987  Mooney ............................... 220/445

FOREIGN PATENT DOCUMENTS 1985588   2/1968  Fed. Rep. of Germany .
127830    7/1968  Fed. Rep. of Germany .
2322388  11/1974  Fed. Rep. of Germany ...... 220/444
2900960   7/1979  Fed. Rep. of Germany ... 73/49.2 T
603444    8/1978  Switzerland ........................ 220/444

Primary Examiner—Stewart J. Levy
Assistant Examiner—Joseph W. Roskos
Attorney, Agent, or Firm—Charles R. Wilson

[57] ABSTRACT

A storage tank having primary and secondary containment means is made from a rigid outer tank shell by forming an inner tank shell of fibrous reinforcing material and resinous material. A gas pervious material is initially positioned on the inside surface of the rigid tank. Leak detection means is used to monitor the closed space between the rigid outer tank and formed inner tank.

13 Claims, 2 Drawing Sheets

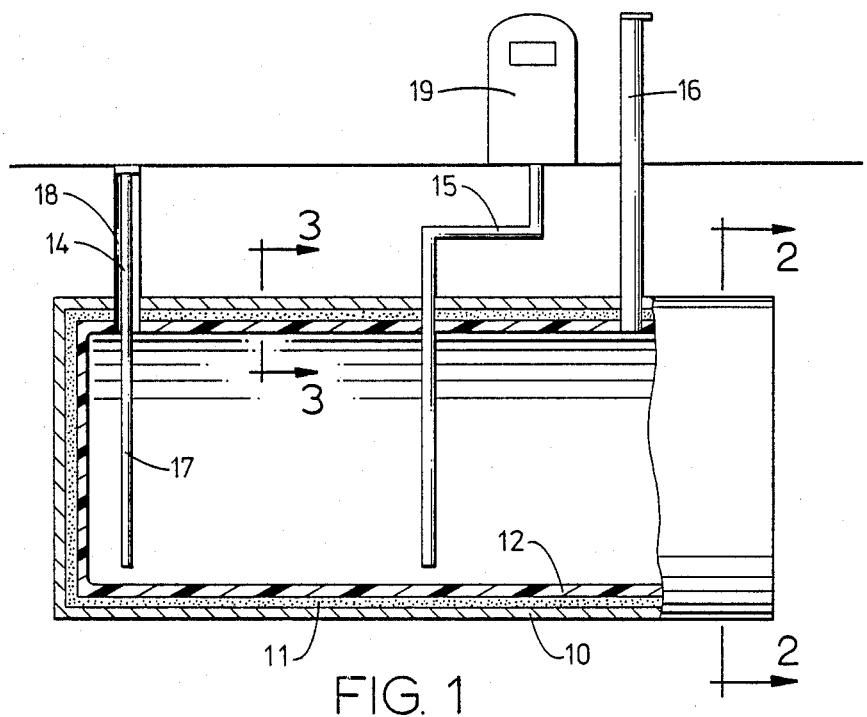
FIG. 1
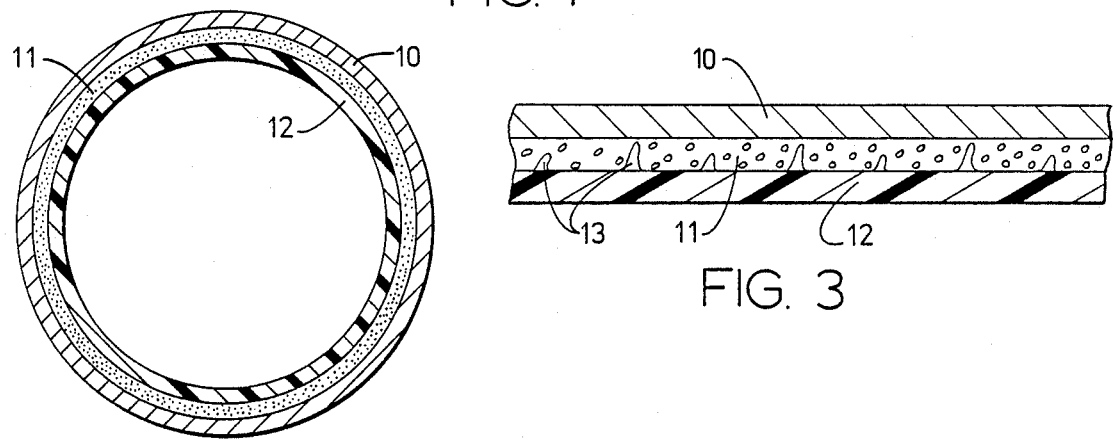
FIG. 2
FIG. 3
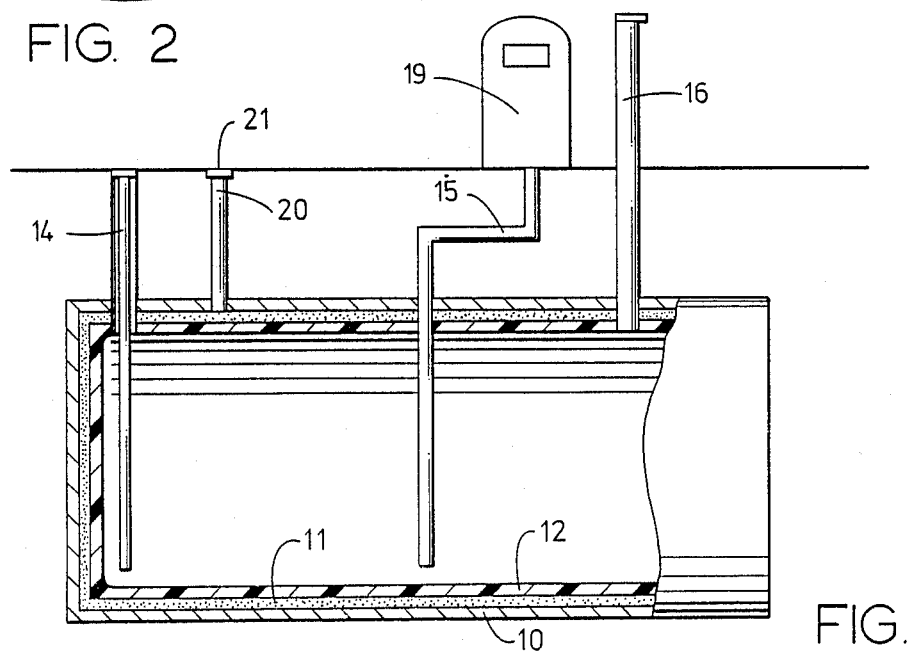
FIG. 4

STORAGE TANKS HAVING FORMED INNER TANK FOR PRIMARY CONTAINMENT

This is a continuation-in-part of "Storage Tanks Having Secondary Containment Means," Ser. No. 06/899,484, filed, Aug. 22, 1986, now U.S. Pat. No. 4,696,186 which is a division of U.S. Ser. No. 740,869, filed 6-3-85, now U.S. Pat. No. 4,607,522, which is a continuation-in-part of "Storage Tank Systems", Ser. No. 580,800, filed Feb. 16, 1984, now U.S. Pat. No. 4,524,609, which is a continuation-in-part of Ser. No. 06/544,012, filed Oct. 21, 1983, now abandoned, and "External Jacket System As Secondary Containment For Storage Tanks," Ser. No. 544,013, filed Oct. 21, 1983, now U.S. Pat. No. 4,523,454.

This invention relates to storage tanks. More particularly, the invention relates to new or refurbished used underground storage tanks which have secondary containment means.

BACKGROUND OF THE INVENTION

Commercial and industrial storage tanks are widely used for storing a great variety of liquids. Some of these liquids are highly corrosive and/or are flammable. The service life of a storage tank will vary, depending upon environmental conditions, including the liquid being stored. Eventually, however, the tank will become corroded and develop leaks, thereby necessitating either the repair of the leak or the complete removal of the tank and replacement with a new tank. Whether the tank is repaired or replaced will depend upon the economics of the situation as well as local ordinances or regulations governing the integrity of commercial and industrial storage tanks. For example, certain storage tanks are commonly used for storing gasoline at service stations. Gasoline, of course, is highly-flammable and poses a significant health and safety hazard if no properly contained. Federal as well as local regulations govern the structure of such storage tanks.

Under certain conditions, it is possible that a storage tank which has developed a leak can be properly repaired without removing it from the earth. This is desired because the time needed to unearth a storage tank, which can range up to 40,000 gallons in capacity, is extremely costly and time consuming. A conventional method of repairing a damaged tank involves applying a coating of polyester or epoxy coating material to the entire interior of the tank. When the material is properly applied, the repaired tank has the same integrity as a new tank. In other instances, it is necessary to remove a storage tank from the ground and replace it with a new storage tank, meeting all the federal and local safety regulations.

Heightened public awareness of the danger posed by storage tanks (particularly underground gasoline storage tanks) has led to additional governmental regulations. Recent proposed regulations will soon require most storage tanks to have secondary containment means and possibly a fail safe design feature to guard against accidental soil, water, and air contamination. Secondary containment means must be capable of containing liquid leaked from the storage tank. Rigid vaulted tanks have been suggested as one alternative. While effective for containment purposes, such tanks are costly and difficult to install because of their weight. A jacket or bladder as disclosed in my U.S. Pat. Nos. 4,523,454, and 4,524,609, also provides secondary containment means and avoids the problems associated with the vaulted systems. Additionally, the aforementioned jacket and bladder system feature a fail-safe design due to the fact they provide continuous monitoring means whereby the integrity of both the primary and secondary containment means are checked to insure that leakage of either containment means is known when it first occurs.

There has now been discovered a method whereby new and used storage tanks can be provided with secondary containment means in a convenient, yet economical manner. Further, used storage tanks can refurbished to a standard equivalent to that possessed by a new tank and then upgraded to have a secondary containment feature.

SUMMARY OF THE INVENTION

A method of adding secondary containment capability to storage tanks comprises the steps of (a) applying a gas pervious separating material to the interior surface of a rigid outer tank shell, (b) and applying over the gas pervious material a layer of a fibrous reinforcing material and a resinous material. When the resinous material is cured, a containment means is formed which substantially approximates the interior shape and volume of the storage tank. The rigid outer tank shell then provides secondary containment for any liquid which may leak from the formed containment means. The space between the rigid outer tank shell and newly formed inner tank occupied by the gas pervious material can be monitored for any leakage from the outer or inner tank shells.

BRIEF DESCRIPTION OF THE DRAWINGS

FIG. 1 is a side view in partial section of a storage tank system having a formed inner shell of fibrous reinforced resinous material as a primary containment means.

FIG. 2 is an end view of the storage tank system taken along line 2—2 of FIG. 1.

FIG. 3 is an enlarged fragmentary section taken along lines 3—3 of FIG. 1.

FIG. 4 is a side view of a storage tank system of this invention illustrating the use of a monitor means.

DETAILED DESCRIPTION OF THE INVENTION

Figure 5:
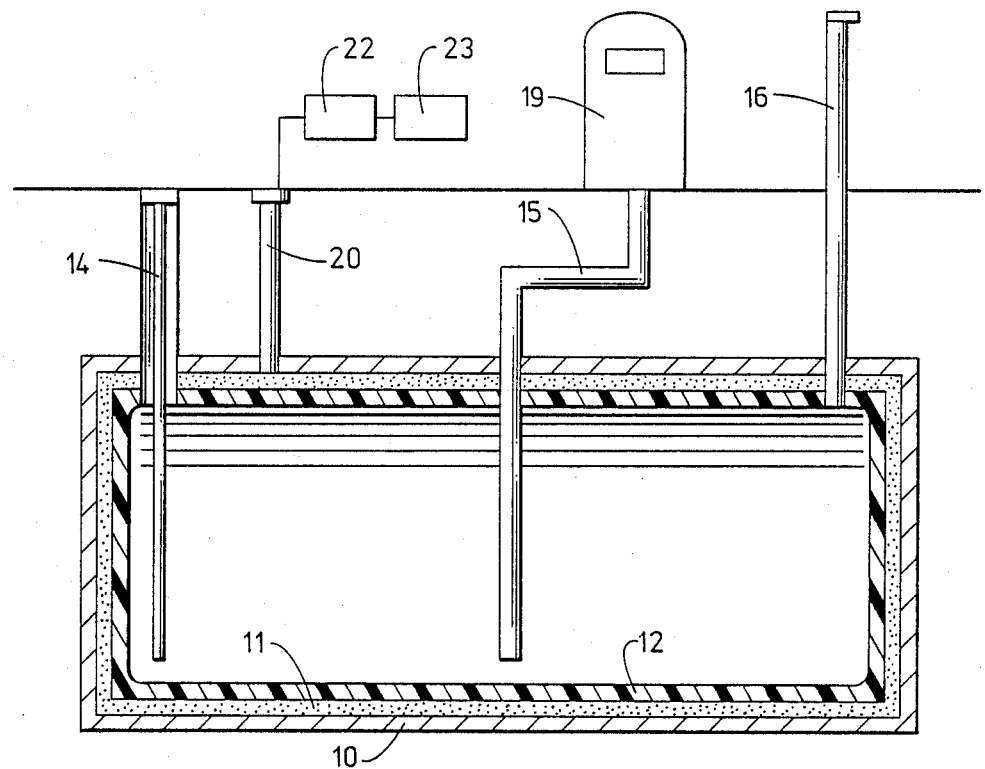
FIG. 5 is a side view of another storage tank system of this invention illustrating a second type of monitor means.

With reference to FIGS. 1 and 2 there is shown a storage tank system comprised of a rigid outer tank shell 10, a gas pervious inner layer 11 and a formed primary containment means 12. Tank shells 10 are well known and widely used. They are typically made of metal or a fiberglass reinforced resin material. The gas pervious material 11 is applied to the rigid tank inner shell surface before the inner tank is formed. The purpose of the gas pervious material is to act as a separating means. It ensures that a subsequently applied fibrous reinforcing material and resinous material which form the inner tank will not adhere to the tank shell. It is necessary that the cured inner tank and outer tank shell have a space between the two and not be rigidly connected together. Any sudden stress in the rigid tank shell which may cause a crack therein is less likely to be transmitted to the inner tank because of the constructions of the tank shell and inner tank. Another function of the closed space is to provide a reliable means by which possible leakage from the outer tank or formed inner tank can be monitored.

Gas pervious separating materials are foraminous or porous and can take on various physical shapes and structures. Examples of such materials are foams, mattings, nets, screens, and meshes. Specific examples are synthetic resinous foam, e.g. a polyurethane or polyester foam, jute, fiberglass matting, cotton matting, nylon matting, corrugated cardboard, and asbestos. The gas pervious material ranges from about 0.025 inches to about 2.0 inches in thickness with an about 0.125 inches to about 0.5 inch thickness being preferred. A minimum thickness is needed to ensure a monitoring space between the tank walls while an excess thickness is avoided because of the adverse effect it has on the structural strength of the formed inner tank. Thus, it has been found the rigid outer tank wall provides support and strength to the formed inner wall when full if the two walls are sufficiently close together. The pressure created by the liquid product contained in the inner tank is transmitted to and partially supported by the rigid outer tank shell.

The gas pervious separating material is positioned on the rigid outer tank's inner surface so as to substantially cover the surface. Preferably an adhesive agent is used to at least temporarily hold the gas pervious material to the outer tank wall while the next step of the method is being performed. Any conventional adhesive agent including double-sided adhesive tapes and adhesive compositions is used which is capable of holding the gas pervious material in position around the tank. As discussed hereafter, one surface of the gas pervious material is preferably sealed prior to its positioning on the rigid tank's walls.

Inner tank 12 is made of a fibrous reinforced resinous material. In one embodiment, the inner tank is formed by first applying a layer of fibrous reinforcing material on the gas pervious material-covered outer tank shell surface. The fibrous reinforcing material can take on many different physical shapes and structures variously referred to as mattings, nets, screens, and meshes. Examples of fibrous materials include fiberglass, nylon, and other synthetic fibrous material. Once applied, a resinous material is next applied to the reinforcing material and thereafter cured. Forming a structure in this manner is generally referred to in the industry as a hand lay-up of fiberglass and resin material. Several different resinous materials are known for the purpose of reinforcing fibrous materials. Such materials include polyesters, e.g. vinylesters, polyethylene, polypropylene, polyvinylchloride, polyurethane, and polyepoxide. The listed resinous materials used in the construction are not all inclusive, but only illustrative of some of the resinous materials which can be used. Curing is effected by applying heat or by use of ambient temperatures and proper selection of catalyst.

In another embodiment, the inner tank is formed by simultaneously applying the fibrous reinforcing material in the form of chopped strands and resinous material from spray guns onto the gas pervious material. A catalyst for the resin is also sprayed onto the surface. A formed tank shell results when the resin cures in place.

The shape of the resultant inner tank made in either embodiment is such that it conforms to the rigid tank shell to form a closed space, but is not a structural part of it because of the gas pervious material. The formed tank shell is capable of containing any liquid which is stored in the inner tank.

FIG. 3 is an enlarged view of a portion of the storage tank system of FIG. 1 showing its wall structure. The resinous material used in forming the inner tank penetrates the gas pervious material to a degree which forms protrusions 13. As long as the gas pervious material remains at least partially open, no special steps need to be taken to prevent the protrusions from forming. In fact, such protrusions provide a benefit of strengthening the total tank system by "tieing" the two walls together. The protrusions from the formed inner tank extend through the gas pervious material, at least when the inner tank is filled with liquid, to make contact with the rigid outer tank wall. In effect, forces from the inner tank are transferred through the protrusions to the rigid outer tank shell. Additionally, the protrusions also ensure that the gas pervious material is not compressed, thereby interfering with the leak detection means. However, to maintain a open space between the tank walls, the surface of the gas pervious material is preferably at least partly sealed to prevent excessive resin penetration. Without some form of sealant, it is possible that the resinous material used in forming the inner tank will penetrate the gas pervious separating material completely; all benefit of the pervious nature of the gas pervious material will then be lost. A polymeric seal or a heat seal on the gas pervious material's surface is preferably used. Any compatible polymeric material is used for this purpose.

Alternatively, a continuous sheet material is placed on the gas pervious material before the inner tank is formed. In this embodiment, the sheet sealing material must be perforated or be at least semi-permeable to any leaked liquid so that the leaked liquid can migrate into the gas pervious material and be detected.

Sufficient openings are found in the rigid outer tank shell and formed inner tank to allow for various access lines to communicate with the interior of the tank. As shown, lines 14, 15 and 16 are a fill pipe, dispensing line and vent pipe, respectively.

The fill pipe provides as its obvious function the means by which gasoline can be pumped into the inner formed tank from an outside source, e.g. a tank truck. As illustrated in FIG. 1, the fill pipe comprises a line 17 through which gasoline flows to the inner tank and a space 18 within the fill pipe which acts as a vapor recovery line. As gasoline is pumped into the inner tank, gasoline vapors which are formed are sucked through the space 18 back to the tank truck for recovery. This reduces the amount of gasoline vapors which would otherwise be vented to the atmosphere or remain in the inner tank preventing the tank from being filled completely with gasoline. As used throughout here, the term "fill pipe" connotes the pipe by which gasoline is pumped to the tank; it can be single pipe, but more often has vapor recovery means associated with it and is often referred to as a vapor recovery fill line. Line 17 extends into the inner tank with its end near the bottom.

Dispensing line 15 is used for withdrawing gasoline and delivering it to the consumer through gasoline dispenser 19. While not illustrated in FIG. 1, a pump is positioned within the inner tank, dispensing line or gasoline dispenser for pumping gasoline to the dispenser. The bottom of the dispensing line is in close proximity with the bottom of the inner tank. The vent pipe 16 is optional, though preferred, and merely provides means by which gasoline vapors resulting primarily from a filling operation can be vented to the atmosphere. The opening to the atmosphere is normally substantially off ground level for safety reasons. All the aforementioned pipes and lines are securely attached to the rigid outer tank.

With reference to FIG. 4, the closed space between the outer tank shell and the formed inner tank is monitored. An access tube 20 extends from ground level through the outer tank shell 10 so as to be in communication with the closed space. Various monitor means are used. For example, the closed space can be filled with a detecting liquid. At the end of the access tube 20 is a sight glass 21. Whenever leakage occurs, a change in the level or color of a detecting liquid will occur and will be readily observed in the sight glass. Also, a liquid level monitor can be used to detect any liquid level change.

Alternatively, the closed space can be placed either under a non-atmospheric pressure, i.e. a positive or negative pressure. Detection means associated with the closed space is capable of detecting any change in pressure resulting from the leak in the jacket or the storage tank. As shown in FIG. 5, there is provided a means 22 for maintaining the closed space under a positive or negative pressure. Conventional air pump or vacuum pump, together with an associated pressure regulator is used. A pressure change sensor 23 is a part of the detection means. A pressure gauge serves this purpose adequately. Alternatively, an access tube with strategically spaced holes extends from the air or vacuum pump to the lower portion of the closed space. When the tube extends over the bottom portion of the storage tank it serves the function of providing a means to monitor for leaked liquid at a low point where it would ultimately flow.

Another embodiment of the detection means utilizes an analyzer capable of detecting the liquid being stored. Thus, the detection means comprises the analyzer 40 which is in communication with closed space. Preferably, a vacuum means for withdrawing gaseous material from the closed space is used for the purpose of obtaining a sample. Thus, in FIG. 5, element 23 could be an analyzer capable of detecting selected liquids instead of a pressure change sensor. A float switch can also be installed in the system to automatically set off an alarm when a pre-set condition is met.

Still another detection means utilizes a probe which extends through an access tube so as to monitor for leakage at or near the bottom of the closed space. The probe is capable of detecting preselected liquids or gases. The gas pervious material permits leakage to ultimately seep to the bottom of the closed space and be detected.

Figure 6:
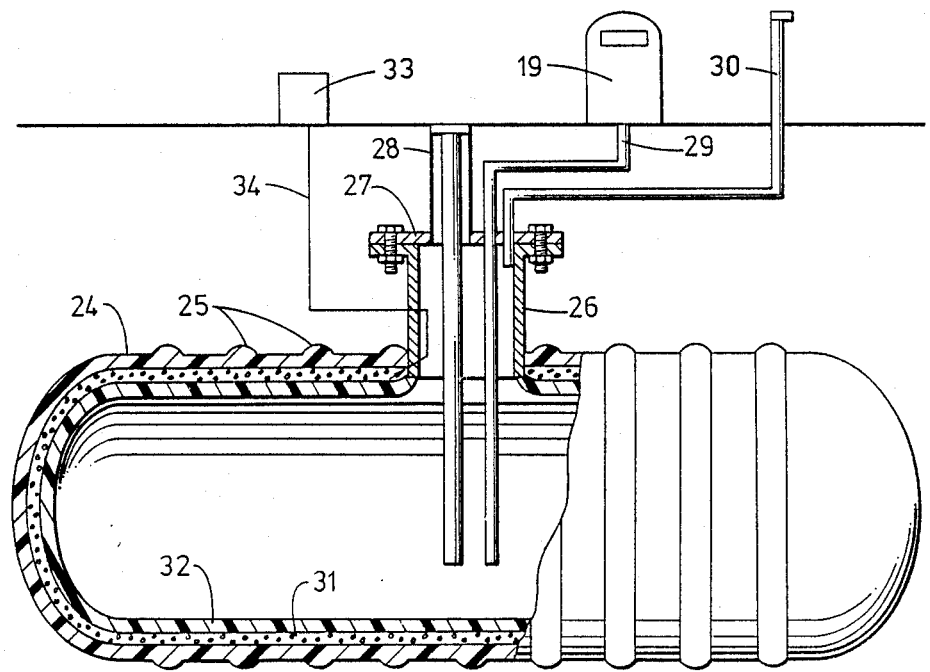
FIG. 6 is a side view in section of another storage tank system based on this invention.

FIG. 6 shows another type of storage tank which is widely used. Rigid outer tank shell 24 is made of a fiberglass reinforced resinous material. Ribs 25 extend circumferentially around the tank to add sufficient strength to the tank to withstand external ground forces. A manway 26 comprised of a collar 26 and removable cover 27 is permanently attached to the rigid out tank shell. Access lines, i.e. fill line 28, dispensing line 29 and vent pipe 30 enter the tank shell through the manway. The installation of the gas pervious material 31 and the formed inner tank 32 are the same as discussed above with references to FIGS. 1-3. Monitor means 33 is any of various devices as discussed above. Such means monitor the closed space between the outer tank shell 24 and formed inner tank 32 via access line 34.

In the embodiment of this invention wherein used storage tanks are utilized, an additional step must be taken. Such tanks which have been used and removed from the ground typically will have weakened areas in the form of holes, cracks, or pits. The first step is to locate the weakened areas and repair said areas. A visual observation of the tank quite often will reveal where the weakened areas occur. A pit is readily repaired with welding or with a resinous material. Resinous materials which are useful here are those which will adhere to the storage tank and which are resistant to liquid stored in the tank. It is possible the weakened area will extend completely through the wall of the storage tank or eventually will corrode to such a point. In such an instance it is necessary that when liquid contacts the resinous repair material that the material itself not be dissolved or corroded away. A wide range of different resinous materials are used which have known qualities of adhering to storage tanks and which are resistant to stored liquids such as fuel. Particularly preferred are the polyester, vinylester and epoxy type resins, which may be reinforced with fiberglass or other known fibrous materials.

All the monitor means discussed above can be electronically linked with an alarm system to audibly or visually warn of a pre-set significant change in the closed spaces. The monitor means and secondary containment means allow for an early warning of a deterioration of either the primary or secondary containment means thereby permitting the necessary repair work to be done before any significant soil or water contamination has occurred.

While the invention has been described with specific reference to the figures, obvious modifications are within the scope of coverage of the claims.

What is claimed is:

1. A method of forming a storage tank system having primary and secondary containment means and the capability to monitor each containment means for leakage, comprising the steps of:
    (a) applying a gas pervious separating material having a thickness ranging from about 0.025 inches to about 2.0 inches to substantially cover an interior surface of a rigid tank shell, said separating material characterized in allowing liquid to readily pass therethrough; and
    (b) applying fibrous reinforcing material and a resinous material onto said gas pervious material so that when cured, an inner tank which substantially conforms to the contour of the rigid tank shell but which is not rigidly connected to the rigid tank shell is formed which is capable of containing liquid.

2. The method of claim 1 wherein the rigid outer tank shell is a metal tank shell.

3. The method of claim 1 wherein the rigid outer tank shell is made of a fiberglass reinforced resinous material.

4. The method of claim 1 wherein the rigid outer tank shell is a used tank which is first refurbished.

5. The method of claim 1 wherein the fibrous reinforcing material is fiberglass.

6. The method of claim 5 wherein the gas pervious material is a foam, matting, net, screen or mesh material.

7. The method of claim 6 wherein the gas pervious material is selected from the group consisting of jute, synthetic resinous foam, fiberglass matting, cotton matting, nylon matting, corrugated cardboard and asbestos.

8. The method of claim 7 wherein the gas pervious material is a polyurethane foam.

9. The method of claim 1 wherein the gas pervious separating material ranges in thickness from about 0.125 inches to about 0.5 inches.

10. The method of claim 1 wherein protrusions are formed in the gas pervious material by application of the resinous material.

11. The method of claim 9 wherein the gas pervious material is at least partly sealed on the surface which subsequently has the fibrous reinforcing material and resinous material applied to prevent excessive resin penetration.

12. The method of claim 1 wherein the fibrous reinforcing material is first positioned onto the gas pervious material and thereafter the resinous material applied.

13. The method of claim 1 wherein the fibrous reinforcing material and resinous material are simultaneously applied to the gas pervious material and cured.

* * * * *